United States Patent [19]

Stahn et al.

[11] 4,154,116
[45] May 15, 1979

[54] SAFETY MANOMETER

[75] Inventors: Peter Stahn; Andreas Gygax, both of Jegenstorf, Switzerland

[73] Assignee: Haenni & Cie. AG, Switzerland

[21] Appl. No.: 928,281

[22] Filed: Jul. 26, 1978

[30] Foreign Application Priority Data

May 23, 1978 [CH] Switzerland .................. 5586/78

[51] Int. Cl.² .............................................. G01L 7/04
[52] U.S. Cl. ...................................... 73/738; 73/739; 73/741
[58] Field of Search ............... 73/738, 741, 756, 739, 73/732–735

[56] References Cited

U.S. PATENT DOCUMENTS

| | | | |
|---|---|---|---|
| 1,499,657 | 7/1924 | Heise et al. | 73/741 |
| 3,293,917 | 12/1966 | Vanderheyden | 73/741 |

Primary Examiner—Donald O. Woodiel
Attorney, Agent, or Firm—Brady, O'Boyle & Gates

[57] ABSTRACT

The front edge (2) of a manometer casing (1) is curved inwardly and secures the window shield (3), located in a sealing ring (5), against being pushed out upon superatmospheric pressure in the housing. A partition (17), in which slotted holes (18, 20, 21) are provided for the indicator shaft (19) and for the bolts (16), is arranged between the support (8) for the indicator mechanism (13) and for the bourdon tube (14) and the dial (15), which is held by bolts (16) at a spacing from said support. The slotted holes extend in a direction running from one casing hole (7) to the axis (29) of the housing and are measured to be sufficiently long, so that the support (8) with the dial (15) and the longitudinally displaceable partition (17) located between them is insertable through the rear opening (24) of the casing (1), wherein an extension (10) on the support (8) is to be outwardly displaced through the casing hole (7). The manometer casing (1) can be manufactured by deep-drawing a sheet metal part, and the measuring unit (27) can be solidly assembled and calibrated with the dial (15) and the pointer (28) before this measuring unit is mounted into the housing (1).

7 Claims, 4 Drawing Figures

SAFETY MANOMETER

BACKGROUND OF THE INVENTION

1. Field of the Invention

This invention relates to a safety manometer which has a protective front window shield that remains in place even when subjected to super atmospheric pressure released inside the manometer behind the window shield.

According to DIN [German Industrial Standard] standards (DIN No. 16,006, Part 1, October, 1976) safety manometers must have a rupture-resistant partition arranged between the dial and the elastic measuring member. It is further required that the holding ring for the window shield is formed and fastened to the casing in such a way that the window shield and the connection to the casing are not released upon release of superatmospheric pressure inside the manometer. In addition, the back face of the casing must be constructed in such a manner that a discharge opening of at least 90% of the back face is made free upon subjection of the interior of the manometer to superatmospheric pressure.

2. Description of the Prior Art

A safety manometer of the aforementioned type which meets these demands has been known from DOS [German Unexamined Laid-Open Application] No. 2,249,266. In this safety manometer the partition is fixedly attached in the cylindrical casing with tongues by welding, rivets, or the like. On its front face the casing bears a bayonet ring, which is connected to it with the aid of a bayonet catch. Located in the beaded, free end of this bayonet ring is an elastic holding ring which tightly receives the window shield.

When this prior known manometer is assembled, first the partition is welded into the casing with the aid of the tongues. Then the support with the measuring member and with the indicator mechanism but without the dial and without the pointer is inserted through the rear opening of the casing and in so doing the support extension is pushed outward through the casing hole. During this process the indicator shaft and a connecting piece, coaxial to said indicator shaft and fastened on the support, are passed through a hole in the partition. The dial is subsequently placed into the housing through the front opening of the casing and said dial is fastened on the connecting piece, whereupon the pointer is positioned on the indicator shaft. Finally the bayonet ring with the window shield is fastened to the front face of the casing and the back face is inserted into the rear opening of the casing.

The manufacture and assembly of the conventional safety manometer are expensive and elaborate. The welding or riveting of the partition tongues onto the casing leaves traces on the outside of the housing and a subsequent treatment of the housing is necessary to remove these traces. The manufacture of the bayonet catch piece on the front face of the casing and of the bayonet ring is likewise elaborate. Finally, the assembly of the manometer is time-consuming because the dial, which is to be placed in front of the partition, and the pointer can only be mounted after the unit has been incorporated into the housing, and cannot simply be assembled during the manufacture of this unit, consisting of support, measuring member, and indicator mechanism. In this connection, the necessary adjustment of the dial and pointer is extremely tedious.

SUMMARY OF THE INVENTION

An object of the present invention is to produce a safety manometer of the aforementioned type, whose housing can be manufactured simply and inexpensively and in whose assembly a pre-constructed and calibrated measuring unit, consisting of support, measuring member, indicator mechanism, dial, and pointer, is insertable into the housing.

The housing of the manometer according to the invention can be manufactured in a simple manner by deep-drawing a sheet metal part. The holding ring or bayonet ring for the window shield required in convention safety manometers becomes superfluous due to the front edge of the casing being inwardly curved in a manner to secure the window shield.

BRIEF DESCRIPTION OF THE DRAWINGS

In the following, an embodiment of the invention is described in more detail with the aid of the appended drawings, in which.

DESCRIPTION OF THE PREFERRED EMBODIMENTS

Figure 1:
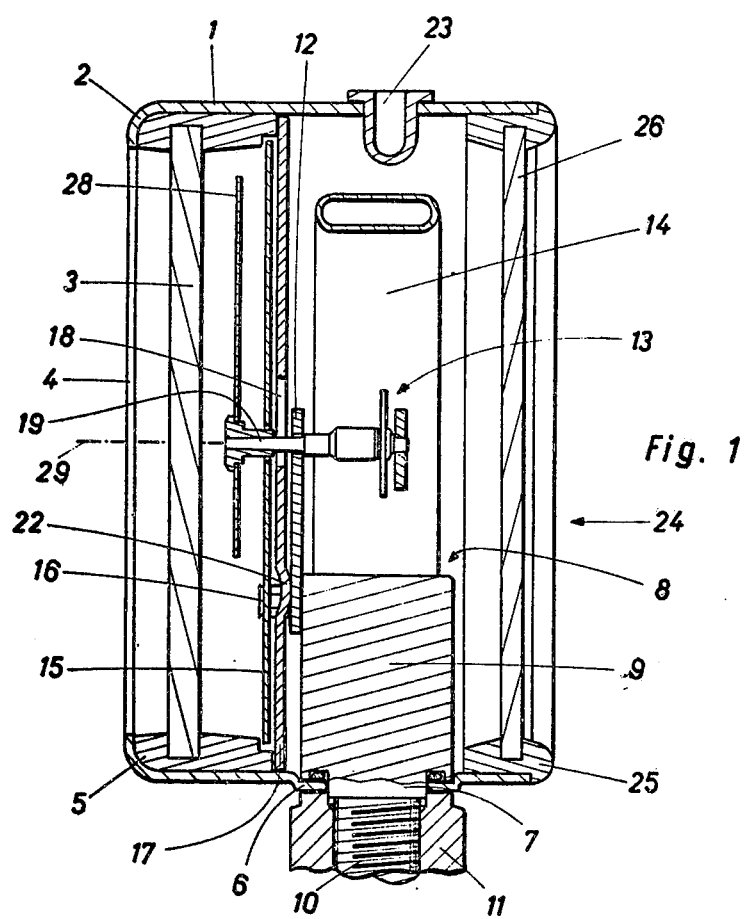
FIG. 1 is a vertical section view through a safety manometer according to the invention.

The safety manometer represented in FIG. 1 has a cylindrical casing 1, the front edge 2 of which is inwardly curved. The casing 1 with the edge 2 is manufactured by deep-drawing a sheet metal part. A window shield 3, the diameter of which is larger than the diameter of the front housing opening 4, which is bounded by edge 2, is located in a sealing ring 5, which is inserted into the casing 1 through the open back side, and which contacts the edge 2.

The bottom wall of the casing 1 is formed with a generally square bulge 6 with a circular hole 7. A support member 8, having a quadratic part 9 adapted to mate with the square bulge 6, in a non-rotatable manner is located in the bulge 6 and has an extension 10 with an external thread, which extension projects through the hole 7 out of the casing 1. An O-ring, which seals off the casing 1 against the outside, is inserted into an annular recess on the lower face of part 9. An external connection piece 11 is screwed onto the extension 10, so that the base of the recess 6 is firmly clamped between the connection piece 11 and the part 9 with the O-ring.

The support plate 12 of a bourdon tube indicator mechanism 13 is mounted on the front face of the support piece 9. The support piece 9 further supports a bourdon tube 14, forming the measuring member in a well known manner. Two bolts 16 are threadedly joined to the support piece 9; the free ends of these bolts are formed as hollow-type rivet shafts and support a dial 15. Each of the bolts 16 has a hexagonal head between the rivet shank and the thread, so that it can be threadedly joined to the support piece 9 with the aid of a hexagon wrench. The dial 15 is held between the beaded free ends of the rivet shanks and the hexagonal heads of the bolts 16 at a spacing in front of the support plate 12.

Figure 2:
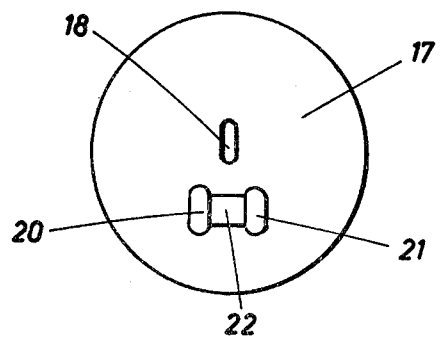
FIG. 2 is a front plan of the partition of the manometer according to FIG. 1 on a smaller scale.
Figure 3:
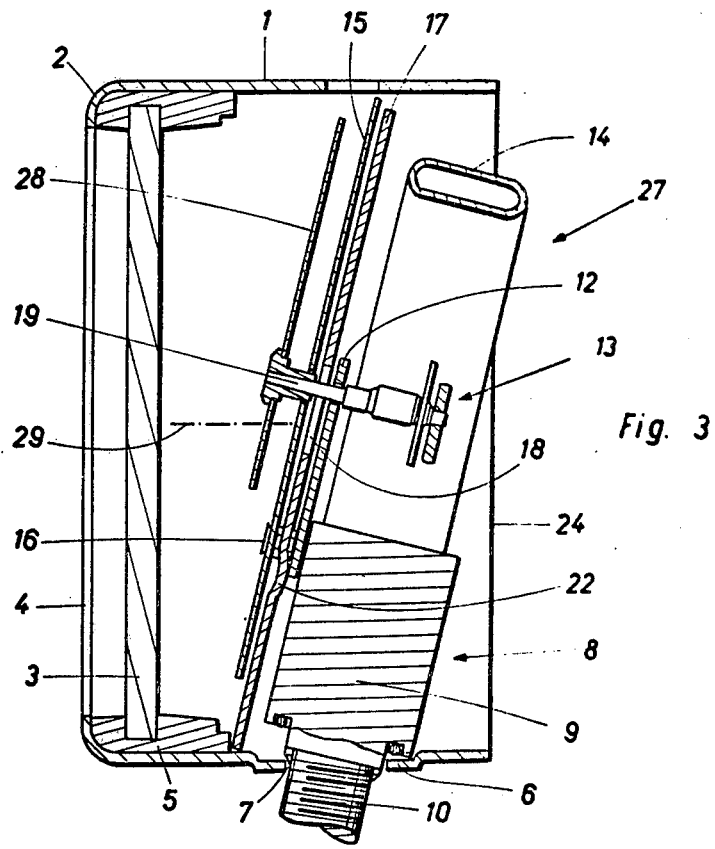
FIG. 3 is a vertical section through the manometer corresponding to FIG. 1, during an assembly step.

As is explained further in this description in more detail in connection with FIG. 3, the diameter of the dial 15 in the drawing is one-eighth smaller than the inner diameter of the casing 1. A rupture-resistant partition 17 made of chromium steel and formed by a circular disk is located between the support plate 12 and the dial 15; the diameter of this partition being larger than the diameter of the housing opening 4 and larger than the diameter of the dial 15, and being smaller than the inner diameter of the casing 1 by a tolerance, so that the partition fits in the casing with clearance. As shown in FIG. 2, the partition 17 has a generally centrally located slotted hole 18 for the indicator shaft 19 of the mechanism 13 and two slotted holes 20 and 21 for the hexagonal heads of the bolts 16. The slotted holes 18, 20, and 21 extend in the direction running from the hole 7 to the center axis 29 of the casing 1; the determination of their length is described further in this description in connection with FIG. 3. Referring to FIG. 1, the indicator shaft 19 and the bolts 16 run through the lower ends of the slotted holes 18, 20, and 21. The partition piece 22 between the two slotted holes 20 and 21 is curved toward the rear and supports and spaces the partition 17, which contacts the sealing ring 5 with its edge, on and from the support plate 12.

On the face opposite the bulge 6, that is, on the top wall, the casing 1 has a filling opening for a damping liquid, for example glycerol, which filling opening is sealed off by a removable elastic sealing plug 23.

The rear opening 24 of the casing 1 is sealed off by a back face 26 which is inserted into an elastic holding ring 25 and together with this is inserted into the casing 1.

When superatomospheric pressure is reached in the housing, such as when the bourdon tube 14 ruptures under great pressure, the back face 26 disconnects from the casing 1 and frees the rear opening 24 to retrieve the interior pressure of the casing.

In assembling the manometer, first the window shield 3 with the sealing ring 5 is pushed through the rear housing opening 24 into the casing 1 until the ring 5 contacts the front inwardly curved edge 2.

As explained in the following with the aid of FIG. 3, the pre-assembled and calibrated measuring unit 27 is subsequently inserted into the casing 1 through the rear opening 24.

The measuring unit 27 includes the support 8, the indicator mechanism 13 with the pointer 28 located on the indicator shaft 19, the bourdon tube 14 connected with the indicator mechanism, the dial 15 firmly connected to the support 8 with the aid of the bolts 16, and the partition 17 located between the support plate 12 and the dial 15, which partition is longitudinally displaceable in the direction of the slotted holes 18, 20, and 21. When the measuring unit 27 is inserted, first the support extension 10 is put into the casing hole 7. Then the measuring unit 27 is in the inclined position represented in FIG. 3, in which position the indicator shaft 19 is located above the center axis 29 of the casing 1. The slotted holes 18, 20, and 21 are measured to be sufficiently long that the downwardly displaced partition 17 contacts the casing 1 with its lower edge. Accordingly, in FIG. 3, the indicator shaft 19 and the bolts 16 run through the upper ends of the slotted holes 18, 20, and 21. The diameter of the dial 15 is dimensioned to be sufficiently large that its upper edge does not quite touch the interior surface of the casing 1. In order that this is insured during the insertion of the measuring unit 27, the diameter of the dial 15 in the example shown can amount to at most seven-eighths of the inner diameter of the casing 1.

The unit 27 is then pivoted from the position shown in FIG. 3 into the final position represented in FIG. 1. In so doing, the partition 17 is upwardly displaced with reference to the indicator shaft 19 and finally is in a position concentric to the dial 15, wherein the indicator shaft 19 and the bolts 16 then run through the lower part of the slotted holes 18, 20, and 21. After the connection piece 11 has been threadedly joined to the extension 10 and the back face 26 with the holding ring 25 has been inserted into the rear opening 24, the housing is filled with a damping liquid through the filling opening and the plug 23 is inserted.

During the assembly process it is especially advantageous that the measuring unit 27 with the pointer 28 and the dial 15 can be pre-constructed and calibrated prior to incorporation into the housing 1.

Figure 4:
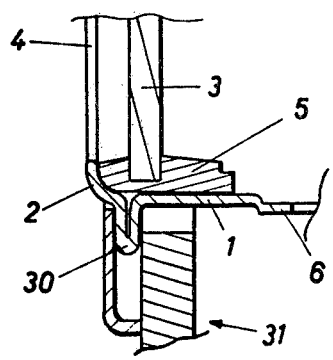
FIG. 4 is a fragmentary vertical section view showing a modified form of the manometer housing according to FIG. 1.

In the modified construction of the manometer housing represented in FIG. 4, a radially, externally curved bead 30 is integrally joined to the front face of the casing 1. The manometer can be fastened on a maintenance panel 31 with this bead, as shown.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A safety manometer comprising a cylindrical casing having a center axis (29) and with front and rear openings; a window shield sealing off the front opening; a back face which disconnects from the casing upon occurrence of superatomspheric pressure interior of the casing sealing off the rear opening; said casing (1) having a front edge (2) inwardly curved and retaining the window shield (3) from being pushed out upon superatmospheric pressure in the housing; a support member (8); an extension (10) on said support member (8) projecting outside through a hole (7) in the casing side wall; a dial (15) firmly connected to the support member (8) by connecting means (16); a rupture-resistant partition (17) connected between the support member (8) and said dial (15) and having a diameter that fits in the casing (1) with clearance; an elastic measuring member (14) connected to said support member (8); an indicator mechanism (13) connected to said elastic measuring member and said support member and including an indicator shaft (19); said partition (17) having slotted holes (18, 20, 21) for the indicator shaft (19) and the connecting means (16); said slotted holes (18, 20, 21) extending in the direction running from the casing hole (7) for the support extension (10) to the center axis (29) of the cylindrical casing (1); said dial (15) having a diameter that is smaller than the diameter of the partition (17) and the length of the slotted holes (18, 20, 21) is sufficiently large that the support member (8) with the dial (15) fixedly attached thereto and with the partition (17), which is located between them (8,15) and is longitudinally displaceable in the direction of the slotted holes (18, 20, 21), is insertable through the rear opening (24) of the casing (1) and that in so doing the support extension (10) can be pushed outwardly through the casing hole (7).

2. A safety manometer according to claim 1, including a sealing ring (5) connected around the perimeter of said window shield (3), which is inserted into the casing (1) and which contracts the front inwardly curved edge (2) of said casing, which sealing ring extends in an axial direction to said partition (17) and secures said partition against forward displacement upon superatomospheric pressure in said casing.

3. A safety manometer according to claim 2, in which said dial (15) is firmly connected to the support member (8) by two bolts (16), said partition (17) having a slotted hole (20,21) for each of the two bolts (16), and said partition having a piece (22) between the two slotted holes (20,21) that is curved in the direction toward the support member (8) in such a way that the partition (17) is held between the support member (8) and said sealing ring (5).

4. A safety manometer as set forth in claim 1, in which said partition is a circular disk (17).

5. A safety manometer as set forth in claim 1, in which said casing (1) with its inwardly curved front edge (2) consists of a deep-drawn sheet metal body.

6. A safety manometer as set forth in claim 1, including a prismatic bulge (6) on the side wall of said casing, said hole (7) for the support extension (10) being formed at the bottom of said prismatic bulge (6) of the casing (1), a portion (9) of the support member (8) located in said bulge (6) and being correspondingly prism-shaped, the support extension (10) adjoining said portion (9) and projecting out of the casing (1), said support extension provided with an external thread, an external connection piece (11) threadedly jointed to the external thread of said support extension (10) in such a way that the bottom of the bulge (6) is firmly clamped between the external connection piece (11) and the prism-shaped portion (9) of the support member (8).

7. A safety manometer as set forth in claim 1, including a radially, externally curved bead (30) integrally joined to the casing (1).

* * * * *

UNITED STATES PATENT AND TRADEMARK OFFICE
CERTIFICATE OF CORRECTION

PATENT NO. : 4,154,116
DATED : May 15, 1979
INVENTOR(S) : PETER STAHN & ANDREAS GYGAX

It is certified that error appears in the above-identified patent and that said Letters Patent are hereby corrected as shown below:

On The Title Page, at [30], the number of the priority application in Switzerland is changed from "5586/78" to --5587/78--.

Signed and Sealed this

Ninth Day of June 1981

[SEAL]

*Attest:*

RENE D. TEGTMEYER

*Attesting Officer*     *Acting Commissioner of Patents and Trademarks*